United States Patent [19]
Schaffner et al.

[11] Patent Number: 5,873,927
[45] Date of Patent: Feb. 23, 1999

[54] INTEGRATED, TANK/HEAP BIOOXIDATION PROCESS

[75] Inventors: Michael R. Schaffner, Battle Mountain, Nev.; John D. Batty, Blairgowrie, South Africa

[73] Assignees: Echo Bay Mines, Limited, Edmonton, Canada; Biomin Technologies SA, Switzerland

[21] Appl. No.: 857,880

[22] Filed: May 16, 1997

[51] Int. Cl.$^6$ .................................................. C22B 3/18
[52] U.S. Cl. .......................... 75/710; 75/712; 75/743; 75/744
[58] Field of Search ................... 75/710, 712, 743, 75/744; 423/DIG. 17

[56] References Cited

U.S. PATENT DOCUMENTS

| | | | |
|---|---|---|---|
| 4,530,763 | 7/1985 | Clyde et al. | 210/610 |
| 4,729,788 | 3/1988 | Hurchins et al. | 75/118 R |
| 5,021,088 | 6/1991 | Potier | 75/736 |
| 5,127,942 | 7/1992 | Brierley et al. | 75/743 |
| 5,143,543 | 9/1992 | Reid et al. | 75/744 |
| 5,246,486 | 9/1993 | Brierley et al. | 75/743 |
| 5,431,717 | 7/1995 | Kohr | 75/744 |
| 5,443,621 | 8/1995 | Kohr | 75/711 |
| 5,573,575 | 11/1996 | Kohr | 75/712 |
| 5,672,194 | 9/1997 | Hunter | 75/712 |
| 5,763,259 | 6/1998 | Panos | 423/DIG. 17 |

FOREIGN PATENT DOCUMENTS 5225890  3/1990  Australia .

*Primary Examiner*—Melvyn Andrews
*Attorney, Agent, or Firm*—Door, Carson, Sloan & Birney, P.C.

[57] ABSTRACT

A metal-containing refractory sulfide ore is split into a first portion and a second portion. The first portion is partially biodigested by a sulfide-digesting microorganism in a biooxidation reactor where the microorganism is acclimated to the sulfide "diet" provided by the ore. The partially digested ore is then combined with the second portion. The resulting material is then dewatered, biooxidized and subjected to a lixiviation process.

27 Claims, 1 Drawing Sheet

INTEGRATED, TANK/HEAP BIOOXIDATION PROCESS

BACKGROUND OF THE INVENTION

1. Field of the Invention

This invention generally relates to recovering precious and/or base metals from refractory sulfide ores and/or concentrates. It is particularly concerned with recovering gold and silver from those refractory sulfide ores that have high levels of sulfide and/or have been concentrated by one or more preceding ore processing steps (e.g., flotation, gravity separation, etc.).

2. Description of the Prior Art

Both precious and base metals are often associated with various sulfide minerals. Ores containing these minerals are usually characterized as "refractory ores" when their metal values are associated with a metallic sulfide host material. Gold, for example, is often found in the form of finely disseminated sub-microscopic particles that are occluded within a refractory sulfide host of pyrite or arsenopyrite. Consequently, the gold-encapsulating sulfide host material must be at least partially oxidized in order to make the ore's gold component more amenable to subsequent recovery processes wherein the sub-microscopic gold particles are exposed to a leaching agent such as cyanide.

Various sulfide oxidizing "pre-treatments" (e.g., treatments that take place prior to leaching an ore's gold component) have been developed. The most commonly used pre-treatments for precious metal-containing refractory ores are roasting, pressure oxidation and/or bacterial oxidation processes. Unfortunately, each of these processes has certain drawbacks. For example, roasting requires that the temperature of the refractory sulfide ore be raised to levels (e.g., approximately 650° C.) that will burn off its sulfide component. At such temperatures, the sulphur and arsenic components of such refractory sulfide ores react with the surrounding air's oxygen to form various noxious gases, e.g., arsenic gases and sulfur oxide gases (e.g., $SO_2$ and $SO_3$). In earlier times, these gases were simply vented to the atmosphere. More and more stringent governmental regulations have, however, restricted such venting practices and mandated addition of scrubbing circuits to remove these contaminants. This has greatly increased the cost of constructing and operating such roasters.

Pressure oxidation processes employ high purity oxygen, (at high temperatures and at high pressures), in order to oxidize the sulfur components of refractory ores. Aside from the hazards associated with high temperatures, high pressures and high oxygen purity requirements, these processes also have the added drawback of high capital costs. These high capital costs follow from the fact that very expensive, corrosion-resistant autoclave equipment is needed to carry out such processes. Indeed, these high costs have prohibited more extended use of pressure oxidation pretreatments, especially for those ore deposits having lower grade ores or small reserves.

Bacterial oxidation of refractory ores falls into two general categories: tank biooxidation or heap biooxidation. Each takes advantage of the fact that certain microorganisms are capable of oxidizing sulfide components of metal sulfide materials (e.g., ores, concentrates, etc.). For example, various bacteria have been used to oxidize sulfide components of iron sulfide refractory ores. The use of tank biooxidation processes is, however, generally limited to use upon those refractory ores having relatively high precious metal values. In general, such processes can not be economically justified to pre-treat those ores or concentrates where the ratio of gold, or precious metal equivalent (in g/t), divided by its sulfur content (in %) is smaller than about 0.7.

The other bacterial oxidation process used to oxidize refractory sulfide ores is open air, heap bioleaching. It begins by breeding a bacterial culture in a liquid medium. The resulting bacteria suspension is then used to inoculate an unconcentrated form of the ore that is stacked in a heap (on an appropriate pad system) in the open air and sprayed with the bacteria suspension. Under such conditions, rather long periods of time (e.g., from about 180 to about 600 days) are usually needed to oxidize a refractory ore's sulfide component. These long process time periods imply large inventory hold-ups and these hold-ups, in turn, imply greater production costs. Eventually, however, refractory ores can be pre-treated by these open air, heap biooxidation processes. After this has been accomplished these treated ores are mixed with lime in order to raise their pH, and then treated by conventional hydrometallurgical treatments such as cyanide heap leaching.

Aside from the long periods of time they require, heap bioleaching processes also have certain technical drawbacks. For example, these processes can not be used to treat ores that have a carbonate matrix. This is due to the low pH requirements of those sulfide digesting bacteria used in such processes. Moreover, when such processes are used on low grade whole ores, a large volume of such ores must be placed on a pad in order to recover even relatively small amounts of precious metals. This circumstance dictates that the heaps must be stacked at lift heights of as much as 20 feet. This, in turn, leads to problems when the ore contains clays and/or fine refractory sulfide materials because such fine materials tend to plug the channels of air and liquid flow in such highly stacked heaps. This results in puddling, channeling, and starvation of nutrients, carbon dioxide and/ or oxygen, as well as uneven inoculum distributions. Blocked heap channels have proven to be particularly debilitating with respect to sulfide-digesting bacteria because these bacteria require especially large amounts of oxygen in order to grow and oxidize the sulfide components of such ores. Adequate air flow is also needed in such heaps in order to dissipate the heat generated by the exothermic biooxidation reactions that are carried out by sulfide digesting bacteria.

Various biodigesting processes have been the subject of a number of patents. For example, South African Patent 90/2244 teaches a tank bioleaching process for treatment of refractory sulphide ores. This process includes the steps of making a slurry from a refractory ore, subjecting the slurry to the biological oxidation action of certain *Thiobacillus ferrooxidans species*, separating the solid component of the slurry, and then recovering the precious metal from said solid component by, for example, cyanidation procedures.

U.S. Pat. No. 5,246,486 teaches a pre-treatment process based upon biooxidation of a sulfide component of a refractory ore. The process begins by coating refractory sulfide ore particles with an inoculate of a bacteria that is capable of attacking the sulfide component of such an ore. After various other treatments, a heap is constructed from these particles and exposed to the action of a cyanide leaching solution.

U.S. Pat. No. 5,143,543 teaches an improved method of mixing biological conversion components (e.g., nutrients and oxygen) into a biomass. To this end, a portion of a biomass is withdrawn from a reaction tank and sent to an injection zone where the conversion components are injected into a portion of biomass previously withdrawn from the reactor. The resulting mixture is then sent to a static mixer where it is combined with other streams. The resulting material is then returned to the reaction tank.

U.S. Pat. No. 5,021,088 teaches a process for pre-treating gold-bearing, carbonaceous or carbonaceous pyretic ores with one or more heterotrophic microorganisms in order to consume the ore's carbon component. The resulting ore is then colonized with at least one microorganism species whose sulfide digestion capability serves to further enhance the ore's susceptibility to subsequent cyanidation processes.

U.S. Pat. No. 4,530,763 teaches a method for removing a metal contaminant from a waste fluid by a process that begins by incubating a bacteria that is capable of attaching to a particular type of metal contaminant. A waste fluid containing the targeted metal contaminant is then introduced into the tank and porous support members with which the bacteria are associated are slowly moved through the waste fluid to allow the bacteria to attach themselves to the metal contaminant component of the waste fluid. The resulting bacteria/metal contaminant is then separated from the porous support material.

U.S. Pat. No. 5,573,575 teaches a process whereby differences in the adhering qualities of refractory ore particles of different sizes are employed to enhance the overall recovery efficiencies of an open heap leaching process. The first step in the disclosed process is to crush the refractory ore and separate it into a fine particle component and a coarse particle component. The coarse particle component is formed into a heap. The fine particle component is made into a large particle concentrate material that is then added to the coarse particle component heap. The resulting coarse particle/large particle concentrate mixture is thereafter exposed to a heap biooxidation treatment.

These prior art processes often suffer from the disadvantage of being prohibitively expensive when they are used upon low grade ores in general—and especially those that emanate from relatively small ore bodies. Indeed, there are large amounts of identified low grade refractory ores, as well as small bodies of higher grade ores and/or many stocks of mined ore, that must be set aside because they cannot be processed economically using current recovery technologies. It is therefore an object of the present invention to provide biooxidation pre-treatment processes that are particularly effective in rendering such ores amenable to lixiviation at economically acceptable costs.

SUMMARY OF THE INVENTION

The present invention provides economically advantageous processes for recovering metal values (precious metals and/or base metals) from refractory sulfide ores. These processes are particularly advantageous when the ore bodies from which such ores are taken are small in overall size and/or characterized by metal values that are low enough to render them uneconomic using the roasting, pressure oxidation and/or bacterial oxidation pre-treatment processes previously noted. Applicants' processes are particularly useful in treating certain refractory sulfide minerals such as pyrite, pyrrhotite and arsenopyrite that contain gold, silver or platinum values. The processes of this patent disclosure also can be used to recover precious metal values and base metal values that are associated with various copper-bearing minerals such as chalcopyrite. Thus, for the purposes of this patent disclosure, copper-bearing ores should be regarded as falling within applicants' use of the terms "ore," "refractory ore" and "refractory sulfide ore." These terms also should be taken to include carbonaceous refractory ores. However, if a given ore also is refractory due to the presence of carbonaceous matter contained therein, additional processing steps known to those skilled in this art also may be employed to treat the carbonaceous components of such ores.

Next, it should be noted that the processes of this patent disclosure can be carried out on a batch basis, or on a continuous basis, or in processes that intermittently use various combinations of batch and continuous modes of operation. Moreover, these processes can be used to treat a wide variety of physical ore forms and grades. For example, they can be used to treat ore concentrates from such varied sources as flotation devices, gravity separation devices and hydrocyclones. The processes of this patent disclosure are, however, especially useful in treating flotation concentrate forms of those refractory ores that can not be economically recovered through use of prior art tank bioleaching processes, heap bioleaching processes or pressure oxidation processes—either because the ore's precious metal values are too low, or because the size of a given refractory sulfide ore body does not warrant the capital expenditures needed to build the facilities needed to carry out these prior art processes, or because the ore's matrix will not allow heap biooxidation. For example, the processes of this patent disclosure are particularly effective when the precious metal values in a refractory sulfide ore are as low as about 0.02 equivalent ounces of gold/ton and/or when the subject refractory sulfide ore body contains as little as about 50,000 equivalent ounces of gold.

Applicants' processes are based upon use of an integrated, tank/heap biooxidation process. Some of the more specific, and more preferred, embodiments of this process sequentially employ a distinct "tank", biooxidation process and an open air, heap bioleach process. The terms "tank" and "reactor" may be used interchangeably for the purposes of this patent disclosure. These terms should not, however, be taken to imply that such tanks or reactors are necessarily completely closed off from the surrounding air.

Be that as it may, the processes of this patent disclosure are more particularly characterized by the fact that a subject refractory sulfide ore (e.g., a stream of a slurry of such an ore) is split into two or more distinct portions. The first portion preferably constitutes from about 5 to about 95 weight percent of a batch or stream of a refractory sulfide ore being processed and the second portion may, likewise, constitute from about 95 to about 5 weight percent of said ore. The first portion of refractory sulfide ore is delivered to a biooxidation reactor where its sulfide component is at least partially digested by one or more sulphide-digesting-microorganism species, e.g., *Thiobacillus ferrooxidans* to produce a resulting biooxidation system. This digestion process also serves to acclimate the sulfide digesting microorganism species to the "diet" provided by that particular refractory sulfide ore. Applicants have found that this acclimation aspect of the tank biooxidation process greatly enhances a microorganism's ability to more effectively digest the sulfide component of the second portion of the refractory sulfide ore when the first and second portions of the refractory sulfide ore are subsequently recombined.

This recombination takes place when at least a portion of the material created by the biooxidation digestion process that is carried out in the tank biooxidation reactor is combined with at least some of the second refractory sulphide ore portion i.e., the portion that was not sent to the biooxidation reactor, but rather was shunted around said reactor. This recombination preferably occurs in a thickener/mixing tank wherein the acclimated microorganism has an opportunity to mix with, and inoculate, the unoxidized refractory sulfide ore in the second portion and thereby produce a more fully inoculated, refractory sulfide ore product. This recombination also serves to allow easier dewatering (e.g., by filtration) of that product.

This more fully inoculated, refractory sulfide ore product is then dewatered. The liquid component of this dewatering procedure includes a suspension of the acclimated, sulfide-digesting microorganisms. This suspension is sent to a heap biooxidation pad where it is employed in a manner hereinafter more fully described. The solid component created by this dewatering procedure may be (but need not be) agglomerated into a particulate form—preferably through use of an agglomeration agent. Regardless of whether or not it is agglomerated, the solid component created by the dewatering procedure is thereafter stacked in a heap and a suspension of the acclimated, sulfide-digesting microorganisms that was previously obtained as a result of the dewatering procedure is applied to said heap. Other microorganism suspensions hereinafter more fully described also may be applied to said heap.

The acids generated by the heap biooxidation process may leach various base metals that may be contained in the solid component derived from the dewatering procedure. These base metals may be recovered by certain solution extraction processes known to those skilled in this art such as, but not limited to, solvent extraction, or resin recovery processes. Regardless of whether base metals are recovered from the heap of solid component material, after the solid component (in either an agglomerated or unagglomerated form) is sufficiently biodigested by the sulfide ore-digesting microorganism contained in the suspension obtained from the dewatering process, the resulting heap, biodigested solid product is prepared for, and subjected to, a lixiviation process whereby the solid component's precious metal values are contacted with and solubilized in, a precious metal lixiviating agent such as, but not limited to, cyanide, ammonia thiosulfate, or thiourea. This lixiviation process can be carried out in a tank or in an open air, heap leach process.

Expressed in patent claim language, one particularly preferred embodiment of the above-described integrated, tank biooxidation/heap biooxidation process will comprise:

(1) splitting a refractory sulfide ore material into a first portion and a second portion;

(2) placing the first portion in a biooxidation reactor wherein at least one sulfide-digesting microorganism species digests a sulfide component of the first portion, biologically multiplies and generally acclimates itself to using the refractory sulfide ore material as a food source and thereby producing a resulting biooxidation system;

(3) combining a portion of the resulting biooxidation system with at least some of (e.g., at least 5% of) the second refractory sulfide ore portion in a thickener/mixing tank and allowing the acclimated sulphide digesting microorganism species contained in the resulting biooxidation system to inoculate a sulfide component of the second portion and thereby produce a more fully inoculated refractory sulfide ore product;

(4) dewatering the more fully inoculated, refractory sulfide ore product to produce a dewatered biooxidation reaction product and a liquid suspension of acclimated, sulfide digesting microorganism species;

(5) placing the dewatered biooxidation product in a heap;

(6) treating the heap with a portion of the liquid suspension of acclimated, sulfide digesting microorganism species; and (7) recovering a heap biodigested solid product from the heap.

Some additional, and often preferred, procedures that may be employed in the above-described process may include agglomerating the dewatered biooxidation reaction product derived from step (4) and/or recovery of base metals from an acid solution created as a result of the heap being treated with the liquid suspension of acclimated, sulfide digesting microorganism species employed in step (6) and/or treating the heap biodigested solid product recovered in step (7) with a precious metal lixiviating agent in order to recover precious metal values from said heap biodigested solid product.

DETAILED DESCRIPTION OF THE INVENTION

Figure 1:
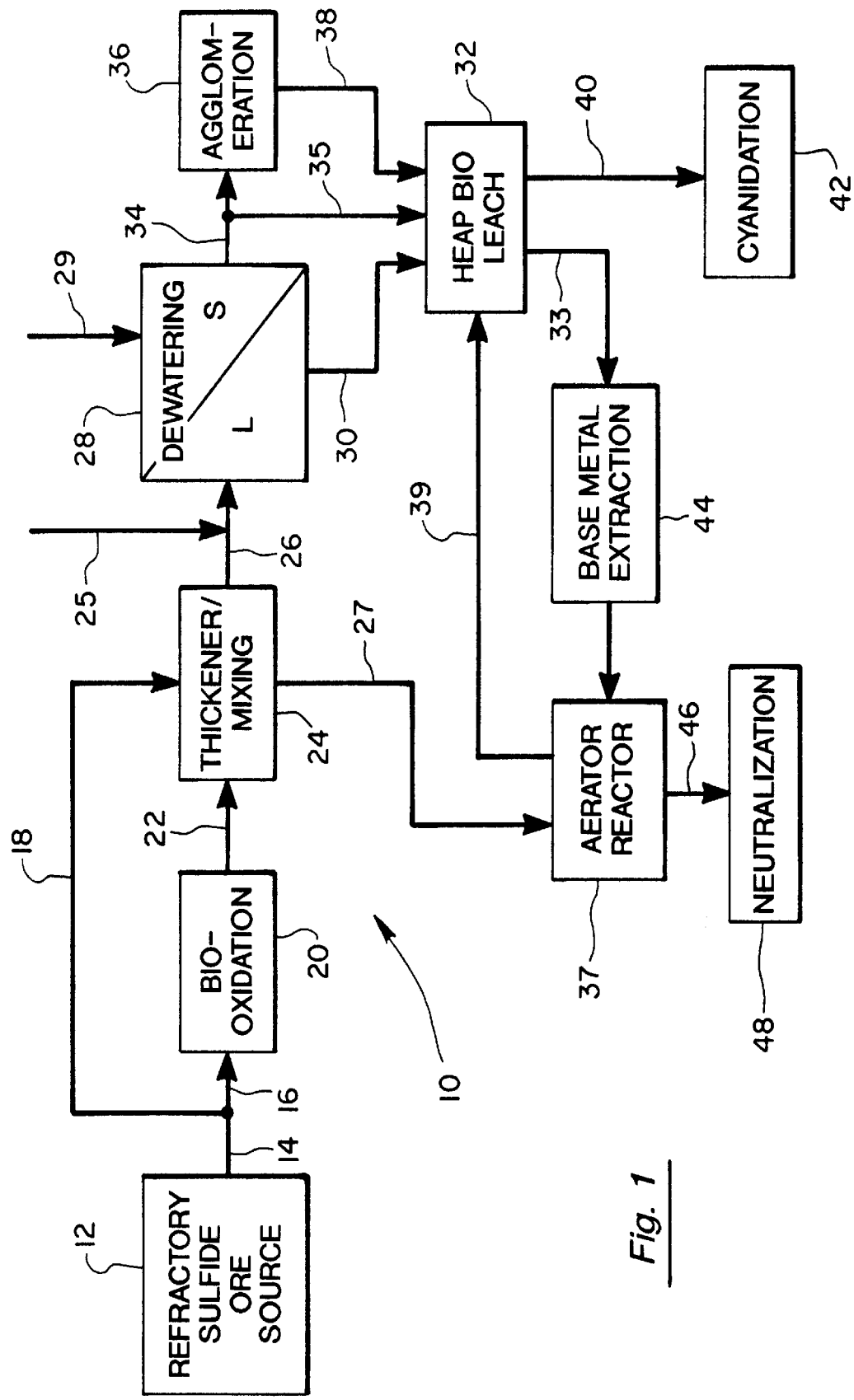
FIG. 1 depicts a flow circuit diagram of a preferred embodiment of a process of this patent disclosure.

For purposes of illustration only, FIG. 1 of this patent disclosure depicts a generally continuous process 10 wherein a subject refractory sulfide ore source 12 can be regarded as being in the form of a slurry of said ore. Such a slurry may be made from a raw ore or from the product(s) of a wide variety of preceding milling, separation and/or concentrating operations. In one particularly preferred embodiment of this invention, the refractory sulfide ore source 12 will be a flotation product of a preceding flotation process.

As depicted in FIG. 1, the material that constitutes the refractory sulfide ore source 12 is split into at least two distinct portions. Again, this splitting can be done on either a flow or a batch basis. For example, FIG. 1 depicts a stream 14 of a slurry of a refractory sulfide ore source being split into two separate and distinct streams 16 and 18 to respectively form a first portion of the ore and a second portion of that ore. The first stream 16 (first portion) is delivered to a biooxidation reactor 20. The second stream 18 (second portion) is shunted around the biooxidation reactor 20. The first refractory sulfide ore portion that is delivered, via stream 16, to the biooxidation reactor 20 is reacted therein (preferably for a period of from about 16 hours to about 96 hours) with one or more microorganism species capable of oxidizing and otherwise digesting at least a portion of the sulfide component of the refractory sulfide ore contained in the first portion.

Some refractory sulfide ore concentrates (e.g., those of pyrrhotite) are however, easier to oxidize and their precious metal values may be released in less than 16 hours (e.g., in about 8 hours). Conversely, concentrates of other ores, e.g., those of pyrite and arsenopyrite, and most particularly those derived from the mineral chalcopyrite, may require biooxidation times as long as 6 days. In one of the more preferred embodiments of this invention, the biodigestion process carried out in biooxidation reactor 20 will be carried out by a *Thiobacillus ferrooxidans* species for a period of from about 16 to about 96 hours at a pH of from about 0.7 to about 2.2 (and more preferably at a pH of from about 1.1 to about 1.7). Be the identity of the sulfide digesting microorganism (s) as it (they) may, during this biooxidation process, the microorganism species not only has (have) the opportunity to digest some of the sulfide that occludes the ore's precious metal value(s), it (they) also, during its (their) cell division reproductive process, has (have) an opportunity to become acclimated to the sulfide "diet" provided by the particular refractory sulfide ore being processed.

It also should be understood that a number of biooxidation tanks (20A, 20B, 20C, etc., not shown in FIG. 1) may be employed according to specific local desires and requirements. Indeed, in many preferred embodiments of this invention, more than one such biooxidation reactor may be employed even though only one is depicted in FIG. 1. Such biooxidation reactors are most preferably operated in a parallel circuit rather than in series. That is to say that this process does not generally require that a biooxidation reactor product be fed into another biooxidation reactor before the resulting product is sent (via line 22) to a thickening/mixing tank 24 wherein the resulting biooxidation system is combined with the second refractory sulfide ore portion. The refractory sulfide ore slurry introduced into biooxidation reactor 20 is preferably agitated by some appropriate mechanical means not shown in FIG. 1, e.g., by mechanically driven stirrers or by sparged air, so that the solid components of the refractory ore are kept in suspension. Air or oxygen also may be sparged into biooxidation reactor 20 in order to provide the necessary dissolved oxygen when an aerobic bacterial digestion process is being carried out therein.

Nutrients such as nitrogen, phosphate, carbonate and potassium also can be added to biooxidation reactor 20 in those forms, concentrations, and ways known to this art. Moreover, since heat may be generated by the biodigestion process carried out in biooxidation reactor 20, it is preferably provided with a heat exchanger, (for example, a cooling coil) in order to maintain the temperature of reactor 20 at a temperature that will support the life of the microorganism species being employed. In the case of *Thiobacillus ferrooxidans*, for example, such reactor temperatures will preferably be maintained in a range of from about 30° C. to about 45° C., and most preferably, at a temperature of about 40° C.

The pH of the slurry in the biooxidation reactor 20 may be maintained by adding acid, lime or limestone to said reactor so that the material's pH is maintained at an appropriate level, e.g., between about 0.7 and about 2.2 (with a more preferred pH value being from about 1.1 to about 1.8) in those cases where a *Thiobacillus ferrooxidans species* is employed as the sulfide-digesting bacteria. In any case, this lime or limestone is more preferably added to the material in reactor 20 as a slurry of slaked lime or limestone.

After the biodigestion process carried out in reactor 20 has proceeded for some prescribed time, a portion of the resulting biooxidation product (comprised of the partially oxidized refractory sulfide ore, a suspension of the sulfide digesting microorganisms, dissolved oxygen, microorganism nutrients and waste products etc.) is transferred to (e.g., by overflow) a thickener/mixing tank 24.

In one preferred embodiment of this invention, a portion (e.g., from about 5% to about 95%, but more preferably about one half) of the resulting biooxidation system produced by biooxidation reactor 20 is mixed with a second portion of unoxidized ore (e.g., flotation concentrate) in a thickener/mixing tank 24 that is preferably large enough to also serve as a surge tank that may be needed prior to those dewatering or filtration operations hereinafter described. This mixing in the thickener/mixing tank 24 will serve to both preacidify and inoculate the combined material prior to its dewatering. Mixing the unoxidized material contained in the second portion of refractory sulfide ore with the resulting biooxidation product of the biooxidation reactor 20, also will yield a material that is much easier to subsequently filter relative to an unblended bioreactor product. In some preferred embodiments of this invention, new feed will be continuously added to the biooxidation reactor 20 via feed line 16. This new feed will be inoculated by the active bacteria in the biooxidation reactor 20 and will displace inoculum and partially oxidized feed from the bioreactor reactor 20 to the thickener/mixing tank 24 via line 22. The size of the biooxidation reactor 20 and feed rate to the reactor will determine the retention time in the reactor, and hence determine the amount of oxidation which occurs in the biooxidation reactor 20.

Preferably, this thickener/mixing tank 24 will primarily serve as the mixing site for those materials originally contained in the first and second portions of the refractory sulfide ore. This tank 24 (or the line 26 leading from it) also may be used for thickening the material constituting the resulting biooxidation system—if this is desired. This thickening operation may be accomplished, for example, by adding a dry or "dryer" form of the subject refractory ore to the mixing tank 24 or more preferably to the line 26 from which a thickened slurry component is removed from said tank 24, e.g., via line 25. Thus, tank 24 may be thought of as either a "thickener", or a "mixing" or a thickener/mixing tank for the purposes of this patent disclosure and consequently will often be referred to as a "thickener/mixing tank." Nomenclature aside, the stream 18 of refractory sulfide ore that was shunted around biooxidation reactor 20 is, most preferably, delivered directly to thickener/mixing tank 24 (as opposed to be delivered to line 22) so that the materials contained in streams 18 and 22 can be more intimately mixed.

Liquid material (a bacterial suspension) from the overflow of the thickening/mixing tank 24 (e.g., overflow resulting from addition of dryer material via line 25) may be applied (e.g., via line 27) to a heap bioleach process 32 hereinafter more fully described. The remainder, if any, of the liquid material displaced from thickener/mixing tank 24 may be disposed of in other ways (e.g., it can be neutralized with limestone, thickened and disposed of), by processes not shown in FIG. 1. Similarly, solution from this neutralization process may be reused in the process or sent to a run-off-pond (not shown in FIG. 1). The solids from such a neutralization/thickening step also may thereafter be disposed of—preferably in conjunction with disposal of flotation or cyanidation tailings by flow circuits which, for purposes of clarity, are not shown in FIG. 1.

This patent disclosure also contemplates addition of other microorganisms to the thickening/mixing tank 24. These added microorganisms may be of the same species as those employed in the biooxidation reactor 20 or they may be of an entirely different species. Thickener/mixing tank 24 also may be provided with those appropriate implements and materials needed to feed, agitate, control the temperature of, etc. the microorganisms employed in said tank 24.

In any case, the resulting, more fully inoculated, refractory sulfide ore product is then dewatered to produce a dewatered biooxidation product. As previously noted this dewatering may occur in thickener/mixing tank 24 by introduction of a relatively dry material via line 25 or, in a more preferred embodiment of this process, this dewatering action is carried out by transferring the resulting, more fully oxidized refractory ore product, via line 26, to a separate and distinct dewatering process 28. Here again, this dewatering process may be accomplished by adding a relatively "dryer" or more concentrated component such as a more concentrated ore to the resulting, more fully oxidized refractory ore product (e.g., via line 29), or it may be accomplished by filtering water from the more fully oxidized refractory ore product. In either case, this dewatering operation creates a solid component S and liquid component L that includes a liquid suspension of the sulfide-digesting microorganisms. The liquid component L is sent, via line 30, to heap bioleach process 32 where it is used to treat the material contained in said heap.

The solid components created by the dewatering process 28 may be sent directly (via line 35) to heap bioleach process 32; or, more preferably, they may be sent (via line 34) to an agglomeration unit 36. Preferably the agglomeration step (if it is employed) will be carried out by mixing the dewatered product with a binding agent (e.g., bitumen, various polymers, etc.), most preferably in a pug mill, drum agglomerator, or on belts in order to form pellets that will not break down when the liquid component L is subsequently applied to them. The agglomerated material is then sent (via line 38) to the heap bioleach process 32. Agglomerated forms are preferred since they will allow for increased percolation and/or air flow through the heap bioleach material. This will substantially decrease the amount of time required for the heap biooxidation process.

The heap stack height may be varied to achieve optimal percolation and air flow rates. Regardless of whether or not it is agglomerated, a material derived from the solid component S of the dewatering process is then stacked on a heap biooxidation pad in either an unagglomerated or in an agglomerated form. The heap stack height may be varied to increase percolation and air flow rate. Treatment of the heap bioleach material with the liquid component L from the dewatering process 28 (and preferably, with liquid overflow from thickener/mixing tank 24) will, by biooxidation process 32, i.e., biooxidation of a sulfide component of the material contained in the solid components derived from the dewatering process 28, produce a heap biodigested solid product that eventually will be sent to (via line 40) a lixiviation process (such as the cyanidation process 42 depicted in FIG. 1). The biooxidation process 32 may be augmented through use of bacteria-containing solutions obtained from recirculated solution run-off obtained from the heap bioleach process 32.

This solution run-off also may contain an active bacterial population. Hence, its pH will preferably be maintained between 0.7 and 2.2 (more preferably between 1.1 and 1.8) preferably through use of acid, lime or limestone, as needed. This run-off solution also is preferably, via recycling line 33, re-oxidized in an aerated reactor 37 to which air (and additional nutrients) may be added. The aerated solution is then preferably returned, via line 39, for irrigation duty with respect to the bioheap leach process 32. In effect, the $Fe^{2+}$ and $As^{3+}$ in the solution run-off are oxidized in aerator reactor 37 to $Fe^{3+}$ and $As^{5+}$. This renders these metals suitable for efficient neutralization. The run-off solution also may contain high concentrations of base metals such as $As^{3+}$ which may reach levels that are toxic to the bacteria. Hence, the $Fe^{3+}$ and $As^{5+}$ levels in these solutions are preferably monitored and, when needed, a portion thereof can be bled off for neutralization purposes and replaced with a new solution if their concentrations get beyond acceptable levels. The solution run-off also may contain other base metals such as lead, zinc, etc. that may be recovered by sending the recirculated run off solution from biooxidation pad 32 (via line 33) to a base metal extraction unit 44 in the manner generally depicted in FIG. 1. As an optional feature, an acidic solution may (e.g., via line 44) be withdrawn from aerator reactor 37 and sent to an acid neutralization unit 48. Again, such recovery may be by use of any number of procedures (e.g., solvent extraction, resin recovery, etc.) known to those skilled in this art.

The bioheap (or bioheaps) that is (are) employed in applicant's processes can be constructed in a manner similar to those employed to construct conventional reusable cyanide heap leach pad systems. In any case, once the solid component S is stacked (on a pad using procedures known to those skilled in this art) in an appropriate heap, solution application lines preferably will be placed on top of the heap, and one or more bacteria-rich, solutions (along with appropriate nutrients) applied to the said heap. Air also may be injected through such lines in the pad overliner in order to supply nutrients, oxygen, carbon dioxide and the like to the heap (and to cool it, if necessary). After sufficient oxidation has occurred to allow for subsequent recovery of the metal content of the heap material, a heap biodigested solid product is removed from the pad to complete the most fundamental part of the process of this patent disclosure. Thereafter, the heap, biodigested solid product may be neutralized (e.g., by use of an alkaline agent) and otherwise prepared for lixiviation. FIG. 1 depicts this lixiviation by a flow line 40 that delivers the heap bioleach material from the heap bioleach process 32 to a cyanidation process 42.

It also should be noted that, if cyanide is chosen as the lixiviant, part of this preparation will preferably include a high temperature alkaline pretreatment of the heap material. Applicants have found that such a high temperature alkaline pretreatment procedure reduces cyanide consumption by denaturing any residual Rhodenese enzyme that may be in the system. Such a heating step also may serve other desired purposes, such as increasing silver recovery by converting argentogerosites to a more leachable form. Such a high temperature alkaline pretreatment is preferably conducted by reslurrying the heap material and heating it in a tank to a temperature ranging between about 50 and 60° C. The slurry is brought up to temperature and sufficient alkaline agent is added to the material to produce a pH that preferably ranges from about 10 to about 12. The alkaline slurry is preferably so heated for about 1 and 12 hours. After such heating, sufficient alkaline agent is added to the material to produce a pH that preferably ranges from about 10 to about 12. These processes will normally complete some of the more preferred "pretreatments" of a subject refractory sulfide ore according to this invention. The refractory ore will then be ready to be treated in a conventional precious metal lixiviation process (e.g., in a cyanidation process) in order to solubilize, and ultimately recover, the precious metal contained in said ore.

As a final note on the processes of this patent disclosure, it should be understood that the efficiency of the bacteria used in these sulfide oxidation processes also can be enhanced through simultaneous use of multiple microorganism species. For example, bacteria mixtures containing *Thiobacillus thiooxidans, Thiobacillus ferrooxidans, Leptospirillum ferrooxidans, Thermosulfidooxidans, Sulfolobus brierlevi, Sulfolobus acidocaldarius,* Sulfolobus BC and/or *Sulfolobus solfataricus* may be employed. In one particularly preferred embodiment of this invention, a mixture of three distinct bacteria species, namely, strains of *Thiobacillus ferrooxidans, Thiobacillus thiooxidans* and *Leptospirllum ferrooxidans,* may be employed to increase the overall effectiveness of these processes. The *Thiobacillus ferrooxidans* are particularly effective in oxidizing the sulfide component of refractory ores. They also are especially preferred in treating arsenopyrite ores because, through selective techniques and acclimation, the arsenic resistance of *Thiobacillus ferrooxidans* can be increased from about 1 gram per liter up to about 15 grams per liter. Other sulfide-digesting bacteria that can be used for the practice of this invention may include *Acidianus species*. They may be used alone, or in mixtures of all of the other sulfide digesting bacteria noted above. It also should be noted that any one or all of these microorganisms species can be added at any convenient point in the overall process e.g., at biooxidation reactor 20 and/or at thickener/mixing tank 24.

Although the processes of this patent disclosure have been described with reference to certain preferred embodiments and specific examples, it will readily be appreciated by those skilled in this art that many modifications and adaptations of these processes are possible without departure from the spirit and scope of the invention as claimed hereinafter. For example, while the processes according to the present invention have been largely described in terms of recovering gold and silver from a flotation concentrate form of a refractory sulfide ore, these processes are equally applicable to other precious metal and base values found in such ores (e.g., platinum group metals), as well as in other ore types (copper-bearing ores) and in other physical forms (crushed ore particles).

Thus having disclosed this invention, what is claimed is:

1. An integrated, tank/heap biooxidation process for recovering a metal from a refractory sulfide ore, said process comprising:

(1) splitting a refractory sulfide ore material into a first portion and a second portion;

(2) placing the first portion in a biooxidation reactor wherein at least one sulfide digesting microorganism species digests a sulfide component of the first portion, biologically multiplies and generally acclimates itself to using the refractory sulfide ore source material as a food source and thereby producing a resulting biooxidation system;

(3) combining a portion of the resulting biooxidation system with at least some of the second portion in a thickener/mixing tank and allowing the acclimated sulphide digesting microorganism species contained in the resulting biooxidation system to inoculate a sulfide component of the second portion and thereby produce a more fully inoculated refractory sulfide ore product;

(4) dewatering the more fully inoculated, refractory sulfide ore product system to produce a dewatered biooxidation reactor product and a liquid suspension of acclimated, sulfide digesting microorganism species;

(5) placing the dewatered biooxidation product in a heap;

(6) treating the heap with a portion of the liquid suspension of acclimated, sulfide digesting microorganism species; and (7) recovering a heap biodigested solid product from the heap biodigestion system.

2. The process of claim 1 wherein the more fully inoculated refractory sulfide ore product is dewatered by filtration.

3. The process of claim 1 wherein the more fully inoculated refractory sulfide ore product is dewatered by addition of a dry ore to the more fully inoculated refractory sulfide ore product.

4. The process of claim 1 that further comprises use of a solution extraction process to recover a base metal from a solution run-off recovered from the heap.

5. The process of claim 1 that further comprises treating the heap biodigested solid products with a precious metal lixivating agent in order to solubilize and ultimately recover a precious metal value from said heap biodigested solid product.

6. The process of claim 1, wherein the lixivation of the heap biodigested solid product is achieved by leaching said product with a cyanide lixiviant.

7. The process of claim 1, wherein the metal is gold.

8. The process of claim 1 wherein the metal is silver.

9. The process of claim 1, where the metal is a platinum group metal.

10. The process of claim 1, wherein the metal is copper.

11. The process of claim 1 wherein the metal is nickel.

12. The process of claim 1 wherein the sulfide digesting microorganism species is selected from the group consisting of *Thiobacillus thiooxidans, Thiobacillus ferrooxidans, Leptospirillum ferrooxidans, Thermosulfidooxidans, Sulfolobus brierlevi, Sulfolobus acidocaldarius*, Sulfolobus BC and *Sulfolobus solfactaricus*.

13. The process of claim 1 wherein the sulfide digesting microorganism species is a *Thiobacillus ferrooxidans* species.

14. The process of claim 1, wherein the sulfide digesting microorganism species is a *Thiobacillus thiooxidans* species.

15. The process of claim 1, wherein the sulfide digesting microorganism species is a *Leptospirillum ferrooxidans* species.

16. The process of claim 1 wherein the sulfide digesting microorganism species is a mixture of microorganism species.

17. The process of claim 1 wherein the sulfide digesting microorganism species is a mixture of *Thiobacillus ferrooxidans, Thiobacillus thiooxidans* and *Leptospirillum ferrooxidans* species.

18. The process of claim 1 wherein a ratio of a gold equivalent (g/t) of the refractory sulfide ore divided by its sulfur content (in %) is smaller than about 0.7.

19. The process of claim 1 wherein the refractory sulfide ore material is split into a first portion that constitutes from about 5% to about 95% weight percent of the refractory sulfide ore material and a second portion that constitutes from about 95% to about 5% weight percent of said material.

20. The process of claim 1 wherein the first portion is digested in the biooxidation reactor by a *Thiobacillus ferrooxidans* species for a period of from about 16 to about 96 hours at a pH of from about 0.7 to about 2.2.

21. The process of claim 1 wherein the first portion is digested in the biooxidation reactor by a *Thiobacillus ferrooxidans* species for a period of from about 16 to about 96 hours at a pH of from about 1.1 to about 1.7.

22. The process of claim 1 wherein the dewatered biooxidation reactor product is agglomerated.

23. The process of claim 1 wherein the dewatered biooxidation reactor product is agglomerated through use of a bitumen agglomerating agent.

24. The process of claim 1 wherein the heap biodigested solid product is mixed with an alkaline agent before it is treated with a lixiviation agent.

25. The process of claim 1 wherein the heap biodigested solid product is heated to a temperature from about 50° to 60° C. for about 1 hour to 12 hours before it is treated with a lixiviation agent.

26. The process of claim 1 wherein the heap biodigested solid product is treated with a cyanide lixiviation agent in a tank.

27. The process of claim 1 wherein the heap biodigested solid product is formed into a heap that is treated with a cyanide lixiviation agent.

* * * * *